Dec. 16, 1924.

E. R. PETERSON

SAW SET

Filed Nov. 6, 1923

1,519,592

Inventor
*Emil R. Peterson*

By *Herbert E. Smith*

Attorney

Patented Dec. 16, 1924.

1,519,592

UNITED STATES PATENT OFFICE.

EMIL ROSSENUS PETERSON, OF ST. MARIES, IDAHO.

SAW SET.

Application filed November 6, 1923. Serial No. 673,090.

*To all whom it may concern:*

Be it known that I, EMIL ROSSENUS PETERSON, a citizen of the United States, residing at St. Maries, in Benewah County and State of Idaho, have invented certain new and useful Improvements in Saw Sets, of which the following is a specification.

My present invention relates to improvements in saw sets embodying a hand implement in the form of pliers in which the set or punch is carried by a pivoted arm or handle that is actuated through the manipulation of the spring pressed plier handles.

The primary object of the invention is the provision of a strong and durable tool of this type adapted for use by woodsmen when spreading the teeth of cross cut saws to widen the kerf cut by the saw, and in which the implement may with facility be adjusted for use with the saw blade and firmly set in adjusted position.

The implement consists in certain novel combinations and arrangements of features involving the set or punch and the anvil and in the manner of adjusting the tool to the saw to be set, as will hereafter be more fully described and claimed.

In the accompanying drawings I have illustrated one complete example of the physical embodiment of my invention wherein the parts are combined and arranged in accordance with the best mode I have thus far devised for the practical application of the principles of my invention.

Figure 1:
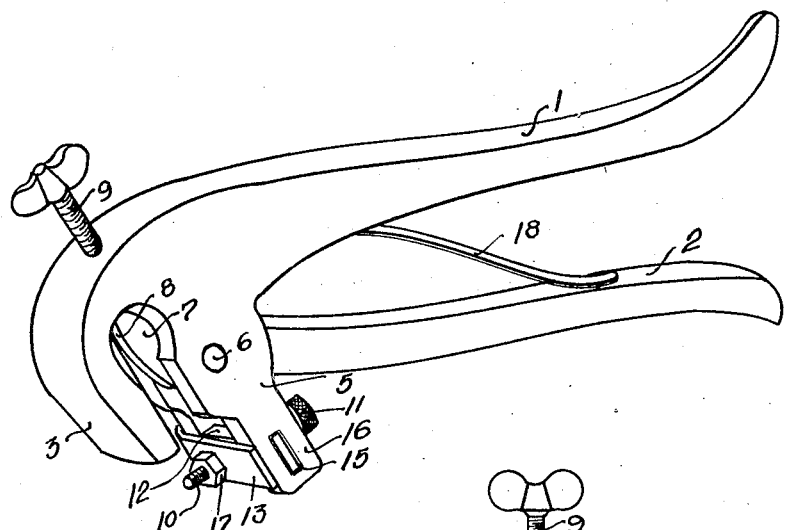
Figure 1 is a perspective view of the implement ready for use.

In the preferred form of the invention as illustrated in the drawing I utilize an implement of the pliers type having the usual handles 1 and 2, the former being the stationary handle and provided with a curved overhanging head 3 that performs the functions of an anvil. The saw blade S is designed to fit snugly against the inner plane face of the anvil which face merges into a setting face 4 involving a compound curve against which the tooth T of the saw is pressed in setting the saw to spread the teeth.

The handle 1 is fashioned with a pair of spaced, depending jaws 5 connected by a pivot pin 6 on which pin the lever handle 2 is pivoted, and this handle is fashioned with an enlargement or punch 7 having a curved edge or face 8 which co-acts with the face 4 of the anvil in setting the tooth T. It will be apparent that by forcing the lever handle, while grasped in the hand, toward the stationary handle 1, the punch 7 is moved into contact with the tooth and the latter is pressed against the anvil face 4 to spread the tooth. Beginning at one end of the saw blade the tool is applied to alternate teeth to spread them laterally in one direction, and then the same performance is repeated by the tool to spread the alternate teeth in the opposite lateral direction, in order to widen the kerf cut by the saw teeth.

A set screw 9 is carried by the stationary member of the tool with its free end in position to act as an abutment for limiting the movement of the punch and the lever handle 2 with relation to the stationary handle 1.

For adjusting the tool to the saw I utilize a gage screw 10 having a thumb-head 11 by which it may conveniently be turned in the nut 12. The nut 12 is threaded for the screw 10 but is retained in fixed position and held by a U-shaped yoke or stirrup 13 that is fashioned with alined openings for the accommodation of the screw 10.

Figure 2:
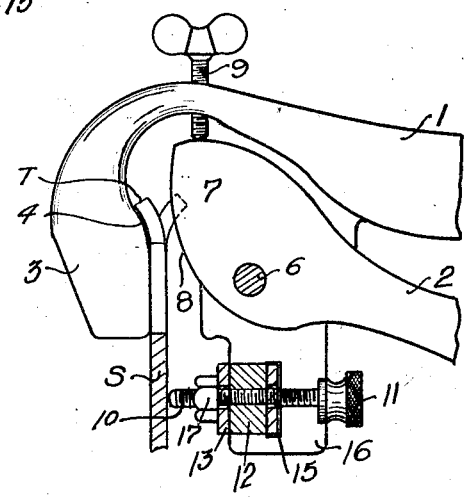
Figure 2 is a view in side elevation at the head of the implement, one of the jaws being broken away, and parts being shown in section for convenience of illustration.
Figure 3:
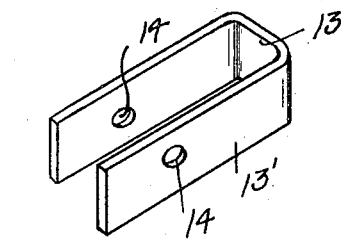
Figure 3 is a perspective view of a yoke or stirrup, detached, as used in connection with the adjusting or gage screw.

The yoke is supported by the jaws 5 of the stationary member of the tool, one of its arms 13′ being passed through an angular slot 15 in each of the extensions 16 at the lower ends of the jaws 5. The other arm of the yoke lies in close contact with the front faces of these extensions, and the stationary nut 12, as seen in Fig. 2 is retained between these arms of the yoke. A lock nut 17 on the gage screw 10 is adapted to frictionally engage the outer face of the outer arm of the yoke 13 and lock the screw in adjusted position. Thus it will be obvious that by turning the gage screw 10 in its stationary nut 12 the screw may be adjusted to contact with the saw blade in order that the tool may be held in proper and identical positions as the setting of the saw proceeds. After the screw is adjusted and the lock nut 17 turned to clamp tight against the yoke, the anvil and the gage screw are utilized to fix the tool in correct position for setting the teeth.

The usual flat spring 18 is interposed between the two handles 1 and 2 to spread the handles after each working stroke of the lever handle for co-action of the punch and anvil.

From the above description taken in connection with my drawings it will be evident that I have provided a strong, durable and compactly arranged tool for hand manipulation which may be operated with facility, and which may be quickly adapted for use with different saws for the purpose of setting their teeth.

Having thus fully described my invention, what I claim as new and desire to secure by Letters Patent is—

In a tool of the pliers type for setting saw teeth the combination with a stationary member having spaced slotted jaws, of a U-shaped yoke having one arm seated in said slotted jaws, a stationary nut embraced by said arms and located between said jaws, a gage screw passing through said arms and threaded in the nut, and a lock nut on the screw exterior of said yoke.

In testimony whereof I affix my signature.

EMIL ROSSENUS PETERSON.